United States Patent [19]

Nishimoto

[11] Patent Number: 5,617,493
[45] Date of Patent: Apr. 1, 1997

[54] WAVEGUIDE TYPE OPTICAL CONTROL DEVICE WITH PROPERTIES OF SUPPRESSED DC DRIFT, REDUCED DRIVING VOLTAGE AND HIGH SPEED OPERATION

[75] Inventor: Hiroshi Nishimoto, Tokyo, Japan

[73] Assignee: NEC Corporation, Tokyo, Japan

[21] Appl. No.: 573,036

[22] Filed: Dec. 15, 1995

[30] Foreign Application Priority Data

Dec. 15, 1994 [JP] Japan .................... 6-311695

[51] Int. Cl.$^6$ .................................... G02B 6/26
[52] U.S. Cl. .................................... 385/40; 385/9
[58] Field of Search ..................... 385/40, 41, 2, 385/3, 8, 9

[56] References Cited

U.S. PATENT DOCUMENTS

| | | | |
|---|---|---|---|
| 4,087,315 | 5/1978 | Auracher et al. | 385/40 X |
| 4,866,406 | 9/1989 | Minakata et al. | 359/315 |
| 5,339,369 | 8/1994 | Hopfer et al. | 385/2 |
| 5,479,552 | 12/1995 | Kitamura et al. | 385/40 X |

FOREIGN PATENT DOCUMENTS

| | | |
|---|---|---|
| 0304602 | 3/1989 | European Pat. Off. . |
| 0478963 | 4/1992 | European Pat. Off. . |
| 0576685 | 1/1994 | European Pat. Off. . |
| 2-005026 | 1/1990 | Japan . |
| 4-110831 | 4/1992 | Japan ............ 385/40 |
| 4-110830 | 4/1992 | Japan ............ 385/40 |
| 2179465 | 3/1987 | United Kingdom . |

OTHER PUBLICATIONS

Lee et al., "Fabrication–Tolerant Δκ Directional Coupler Switch Using Annealing in Proton Exchange", *Optics Communications*, vol. 102, No. 3/4, Oct. 1, 1993, pp. 221–224.

Primary Examiner—John D. Lee
Attorney, Agent, or Firm—Young & Thompson

[57] ABSTRACT

An optical control device has two waveguides close to each other formed in a main surface of a substrate of a dielectric and light-transparent material with an electrooptic effect, three electrodes formed on the main surface at an inside area and opposite outside areas of the waveguides, respectively, and a so-called buffer layer interposed between the main surface and the electrodes. In order to suppress the so-called DC drift and to reduce the driving voltage, the buffer layer is separated into three sections under the three electrodes and are spatially separated from one another. Each of two outside electrodes is partially in direct contact with the main surface by extending along a side surface of each of the outside buffer layer sections. Alternatively, the outside electrode is partially in direct contact with the main surface through a hole formed in the outside buffer layer sections. Alternatively, the outside buffer layer sections can be omitted so that the outside electrodes are entirely in contact with the main surface.

8 Claims, 2 Drawing Sheets

WAVEGUIDE TYPE OPTICAL CONTROL DEVICE WITH PROPERTIES OF SUPPRESSED DC DRIFT, REDUCED DRIVING VOLTAGE AND HIGH SPEED OPERATION

BACKGROUND OF THE INVENTION

1. Field of the Invention

The present invention relates to optical control devices, and, in particular, to such devices of an integrated type or a waveguide type having a buffer layer.

2. Description of the Related Art

In the field of optical control devices, there exists optical switches for switching optical paths in an optical communication network, optical modulators for modulating an intensity or a phase of a light beam transmitted through the waveguide or waveguides, optical filters for filtering a light component of a particular wavelength, and others.

In the prior art, an optical control device of a waveguide type or an integrated type is known which comprises a light-transparent dielectric substrate with an electrooptic effect such as $LiNbO_3$ or $LiTaO_3$, a waveguide or waveguides formed in a main surface of the substrate, and electrodes formed on the main surface for controlling a light beam transmitted through the waveguide or waveguides by an electric driving voltage signal applied to the electrodes. The waveguide is formed by diffusing metallic ions into the main surface, typically, in-diffusion of Ti ions. The electrode is formed on the main surface in form of a thin metallic film such as Al, Au or other metals by the CVD method or other thin film forming methods.

There is known in the art such an optical control device of a type which has two waveguides at least partially parallel with each other and close to each other, and three or two electrodes disposed along the waveguides, one being disposed at an inside region between the two waveguides, the other at outside regions of the two waveguides.

In a known optical control device of the type described above, the electrodes are directly formed on the main surface of the substrate. In another known device, a so-called buffer layer is formed on the main surface of the substrate and the electrodes are deposited on the buffer layer.

The buffer layer is used for preventing a light beam transmitted through the waveguides from being absorbed by the electrodes and for enabling to adjust transmission velocity of a microwave through the electrodes by selection of a thickness and/or dielectric constant of the buffer layer to thereby facilitate the high speed operation of the device. The buffer layer is made of a dielectric and light-transparent material which has a refractive index smaller than that of the substrate and a relatively low dielectric constant. Typically, $SiO_2$ film is used for the buffer layer.

However, it is known in the art that the use of the buffer layer causes problems of a so-called DC drift and an increased driving voltage.

The DC drift is a phenomenon in which a light output changes or shifts during operation by use of a DC voltage or a low frequency voltage applied to the electrodes. This phenomenon is considered to be caused by impurity ions in the buffer layer moving in response to the electric field generated by the voltage applied to the electrodes. Those impurities are believed to be Na, K and other ions taken into the buffer layer from the environment or Li ions from the substrate of $LiNaO_3$ and $LiTaO_3$.

Since a driving voltage applied to the electrodes is dropped at the buffer layer having the relatively low dielectric constant, the driving voltage must unfortunately be a relatively high voltage.

Further, it is known in the art that the optical control device suffers from a so-called temperature drift in which its operating voltage changes by temperature variation. This is because the substrate such as $LiNbO_3$ or $LiTaO_3$ has the pyroelectric effect so that localization of electric charges is caused by the temperature variation.

SUMMARY OF THE INVENTION

Accordingly, it is an object of the invention to provide a waveguide type optical control device which is operable by a reduced driving voltage with a DC drift suppressed.

It is another object of the present invention to provide the optical control device which is operable at a high speed.

It is another object of the present invention to provide the optical control device which is improved in the temperature drift.

According to the present invention, an optical control device can be obtained which comprises: a substrate having a main surface and being of a first dielectric and light-transparent material with an electrooptic effect; two waveguides formed in the main surface of the substrate and having parallel portions close to each other; a first buffer layer section formed on the main surface between the parallel portions of the waveguides, the first buffer layer being of a second dielectric and light-transparent material having a refractive index smaller than that of the substrate and a dielectric constant of 15 or less; a first electrode formed on the first buffer layer; and at least one second electrode formed on the main surface of the substrate adjacent to and outside of the parallel portions of the waveguides, the second electrode being spatially separated from the first electrode and the first buffer layer section.

The optical control device may further comprise a second buffer layer section of the second dielectric and light-transparent material interposed between the second electrode and the main surface of the substrate, the second buffer layer section being spatially separated from the first buffer layer section, the second electrode partially being in direct contact with the main surface of the substrate.

In the optical control device, the second buffer layer section may have a side surface near one of the waveguides, the second electrode extending on the side surface to be in direct contact with the main surface of the substrate adjacent the waveguide.

In another aspect of the optical control device, the second buffer layer section may have a hole through which the second electrode extends to be in direct contact with the main surface of the substrate.

The optical control device may comprise two second electrodes disposed at opposite outsides of the parallel portions of the two waveguides.

In the optical control device, the first buffer layer section may have opposite extensions extending onto the parallel portions of the waveguides In the optical control device, the substrate is of a X-plate or a Y-plate.

DESCRIPTION OF THE PREFERRED EMBODIMENTS

Prior to a description of the preferred embodiments of the present invention, description will be made, with reference to FIGS. 1 and 2, as regards two optical control devices known in the prior art in order to facilitate the understanding of the present invention.

Figure 1:
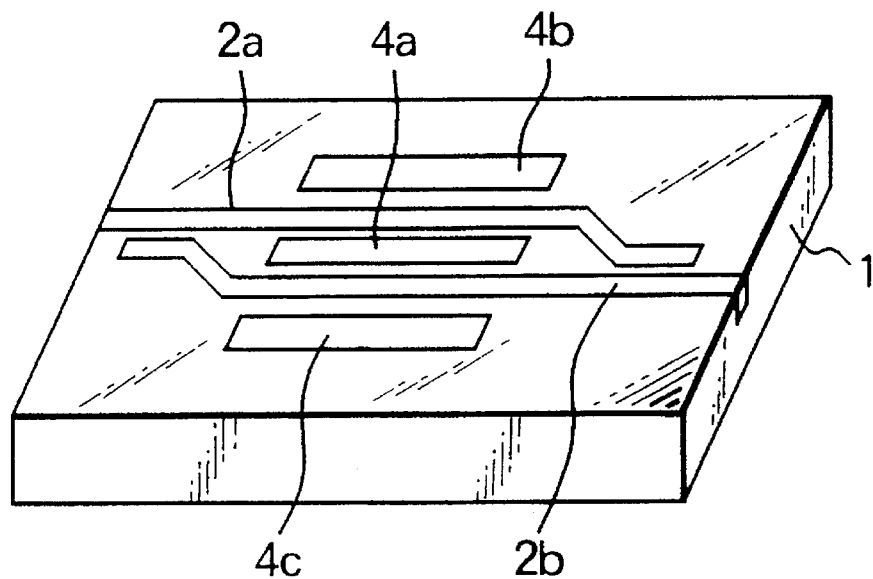
FIG. 1 is a perspective view of a known optical control device, with a relationship of a substrate, two optical waveguides and three electrodes being schematically illustrated.

Referring to FIG. 1, a known optical control device of an optical waveguide type comprises a light transparent and dielectric substrate 1 with an electrooptic effect, two optical wavegides 2a and 2b formed in a main surface of the substrate 1, and three metallic electrodes 4a, 4b and 4c on the main surface of the substrate 1. Two optical waveguides 2a and 2b are formed close to each other with parallel portions forming a directional coupler, as shown in the figure. The electrodes 4a, 4b and 4c are formed along those parallel portions of the waveguides 2a and 2b with electrode 4a being disposed on an inside surface region between waveguides 2a and 2b while other electrodes 4b and 4c being on surface regions outer opposite sides of the two waveguides 2a and 2b.

In the device, a light beam incoming waveguide 2a is coupled to waveguide 2b by the directional coupling between the waveguides 2a and 2b, and outgoes therefrom. When a modulating voltage such as a microwave is applied across electrode 4a and electrodes 4b and 4c, the coupling between waveguides 2a and 2b is modulated so that the outgoing light beam from the waveguide 2b has a modulated light intensity. The device also serves as an optical switch by the use of a suitable voltage applied across electrode 4a and electrodes 4b and 4c.

In the device of FIG. 1, it is known that the light beam transmitted through waveguides is disadvantageously absorbed by metallic electrodes 4a, 4b and 4c.

In order to solve the absorption of light beam by metallic electrodes, it is known in the prior art that a buffer layer is deposited on the main surface of the substrate and those metallic electrodes are formed on the buffer layer. The buffer layer is made of a transparent dielectric material which is smaller in the refractive index than the substrate.

Figure 2:
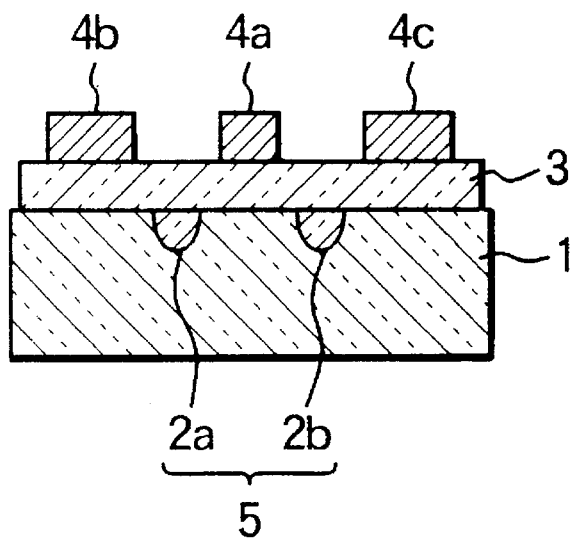
FIG. 2 is a cross-sectional view of another known optical control device with a buffer layer.

Referring to FIG. 2, an optical control device is shown in a cross-sectional view and comprises a substrate 1, optical waveguides 2a and 2b, and metallic electrodes 4a, 4b and 4c, similar to those In FIG. 1 but with a provision of the buffer layer 3 deposited on the main surface of the substrate 1.

In the prior art, LiNbO$_3$ or LiTaO$_3$ is used as a typical material for the substrate 1. Each of the waveguides 2a and 2b is formed by selective diffusion of, for example, Ti ion in the main surface of the substrate. The buffer layer 3 is made of, for example, SiO$_2$ and formed by the known CVD method.

However, the known optical device having the buffer layer suffers from the DC drift, the relatively high driving voltage, and the temperature drift.

Figure 3:
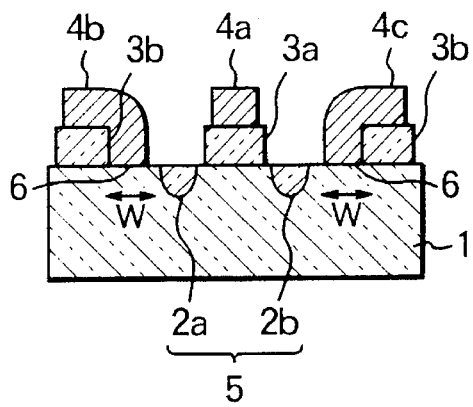
FIG. 3 is a cross-sectional view of an optical control device according to one embodiment of the present invention.

Referring to FIG. 3, an optical control device according to an embodiment of the present invention as shown therein is similar to the known devices of FIGS. 1 and 2 except that the buffer layer is formed into three separated sections, one represented by 3a being under the inside electrode 4a while the others are represented by 3b being under limited portions of the outside electrodes 4b and 4c, respectively.

Namely, the device comprises substrate 1 of a light transparent and dielectric material with an electrooptic effect, two optical waveguides 2a and 2b formed in the main surface of the substrate 1 to form the directional coupling optical circuit 5, three buffer layer sections 3a, 3b and 3b formed on the main surface, and three electrodes 4a, 4b and 4c formed on the three buffer layer sections 3a, 3b and 3b, respectively.

In detail, the inside buffer layer section 3a is disposed between the waveguides 2a and 2b, and the inside electrode 4a is entirely deposited onto the inside buffer layer section 3a. The outside buffer layer sections 3b and 3b are formed outside and spaced from the two optical waveguides 2a and 2b, respectively. The outside electrodes 4b and 4c are formed so that they are partially on the outside buffer layer sections 3b and 3b and extend on the inner side surfaces to the main surface of the substrate at spaces shown at 6 between the optical waveguides 2a and 2b and the outside buffer sections 3b and 3b, respectively. The outside electrodes 4b and 4c are partially deposited on the main surface of the substrate and the remaining portions are on the outside buffer layer sections 3b and 3b. It should be noted that the outside electrodes 4b and 4c are in no contact with the waveguides 2a and 2b but are short of or away from the outer edges of waveguides 2a and 2b, respectively. Accordingly, the inside buffer layer election 3a is spatially separated from the outside buffer layer sections 3b and 3b and also from outside metallic electrodes 4b and 4c.

The spaced surface portion between each of the waveguides and the adjacent one of the buffer layer sections is preferably formed with a width w of 0.1–50 μm in a direction perpendicular to the parallel portions of the waveguides 2a and 2b. In this connection, the waveguides usually have a distance of 3–60 μm therebetween, each having a width of 3–10 μm The optical circuit 5 of waveguides 2a and 2b may not be the directional coupler type but may be a Mach-Zehnder type, balanced-bridge type, and others.

The substrate is of LiNbO$_3$ or LiTaO$_3$.

The buffer layer sections 3a, 3b and 3b is for preventing the electrodes 4a, 4b and 4c from absorbing a light beam transmitted through the waveguides 2a and 2b, and also controlling a transmitting velocity of a microwave through the electrodes 4a, 4b and 4c by selection of a thickness of and a dielectric constant of the buffer layer sections. Accordingly, the material for the buffer layer sections 3a, 3b and 3b should have light transparency, a refraction index lower than the substrate, and a dielectric constant of 15 or less. As the material for the buffer layer sections, there are listed $SiO_2$, ITO, $Al_2O_3$, $MgF_2$, SiON, $Si_3N_4$, and $SiO_2$ doped with phosphorus (P), titanium (Ti), boron germanium (Ge), or the like. The deposition of the buffer layer onto the main surface of the substrate 1 is carried out by the CVD method, the sputtering method, evaporating method, and the like.

As materials for electrodes 4a, 4b and 4c, there are used various electroconductive materials such as Au, Al, Mo, Cu, WSi, ITO, ZnO, and conductive polymeric materials.

In FIG. 3, buffer layer sections 3a and 3b are spatially separated from each other and are electrically insulated from each other. This enables to suppress impurity ion movement in the buffer layer sections 3a and 3b which causes the DC drift. Therefore, the DC drift can effectively be suppressed in the device of FIG. 3.

Further, the outside electrodes are in direct contact with the spaced regions 6 in the main surface the substrate 1 adjacent the waveguides, respectively. Therefore, a driving voltage is directly applied to the substrate through no buffer layer. Accordingly, the device can be driven by a relatively low driving voltage.

Since outside buffer layer sections 3b and 3b are disposed under the outside electrodes 4b and 4c as well as inside buffer layer 3a is disposed under the inside electrode 4a, it is possible to adjust the velocity of the microwave transmitting through the inside electrode 4a by controlling the thickness and the dielectric constant of the buffer layer sections 3a and 3b. Therefore, a high speed operation more than 20 GHz can be achieved.

In this connection, when the substrate 1 is made of $LiNbO_3$ which has a dielectric constant of 28–43, the buffer layer sections 3a and 3b are made of a transparent material having a dielectric constant of 15 or less so as to make the large velocity of the microwave transmission to thereby match with a transmitting velocity of the light beam which is determined by the the refractive index about 2.2 of the $LiNbO_3$ substrate.

Figure 4:
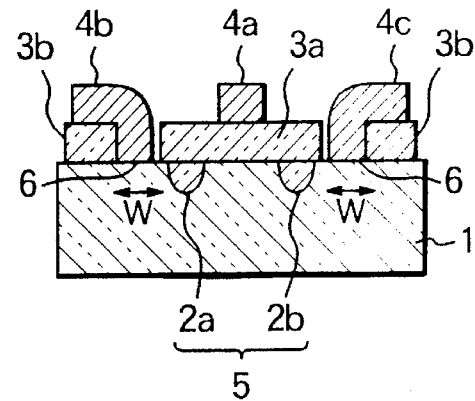
FIG. 4 is a cross-sectional view of a modification of the device shown in FIG. 3.

Referring to FIG. 4, the device shown therein is a modification of the device of FIG. 3 and is similar thereto except the inside buffer layer section 3a is extended onto the waveguides 2a and 2b but are spatially separated from outside electrodes 4b and 4c and outside buffer layer sections 3b and 3b. The modified device has the effects similar to the device of FIG. 3 and further has an additional effect that the light transmission loss due to light scattering can be suppressed because the waveguides are covered with the buffer layer section 3a of the transparent material having a refractive index lower than the substrate 1.

Figure 5:
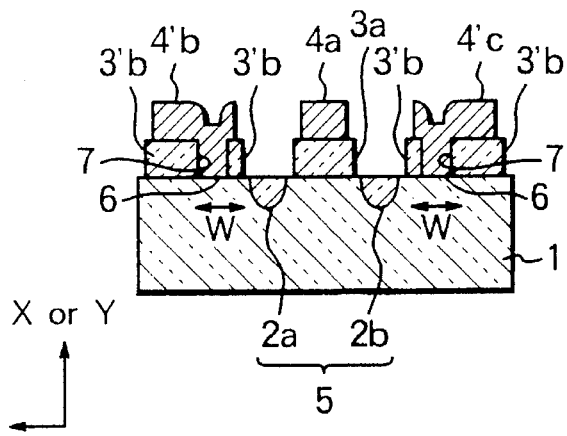
FIG. 5 is a cross-sectional view of an optical control device according to another embodiment of the present invention.

Referring to FIG. 5, an optical control device according to another embodiment shown therein is similar to the device of FIG. 3 except structures of the outside buffer layer sections 3b and 3b and the outside electrodes 4b and 4c. The similar parts are represented by the same reference symbols as in FIG. 3 and the description thereto is omitted.

In FIG. 5, the outside electrodes 4b and 4c do not extend on the inner side surfaces of the outside buffer layer sections 3b and 3b in FIG. 3. But the outside buffer layer sections 3'b and 3'b extend near the outside edges of the waveguides 2a and 2b and are formed with holes 7. The outside electrodes 4'b and 4'c are formed on top surface of the outside buffer layer sections 3'b and 3'b and are also formed in the holes to thereby contact with portions 6 in the main surface the substrate at the bottom of the holes 7 in the buffer layer sections 3'b and 3'b.

In the embodiment, the buffer layer sections 3a, 3'b and 3'b are spatially separated from each other, so that the DC drift is suppressed. Further, the outside electrodes 4'b and 4'c are in direct contact with the main surface of the substrate 1 so that the driving voltage is reduced in the similar manner as in FIG. 3. Moreover, both side surfaces of the inside buffer layer section 3a face the adjacent inner side surfaces of the outside buffer layer sections 3'b and 3'b, respectively, so that the outside buffer layer sections 3'b and 3'b are partially under inner portions of the outside electrodes 4'c and 4'c adjacent to the inside electrode 4a. Therefore, it is easy then in FIG. 3 to adjust the velocity of the microwave transmitted through the electrodes 4a–4c by control of the thickness and the dielectric constant of the buffer layer sections 3a, 3'b and 3'b.

The width W of each of the holes 7 can be selected to be 0.1–100 μm.

Figure 6:
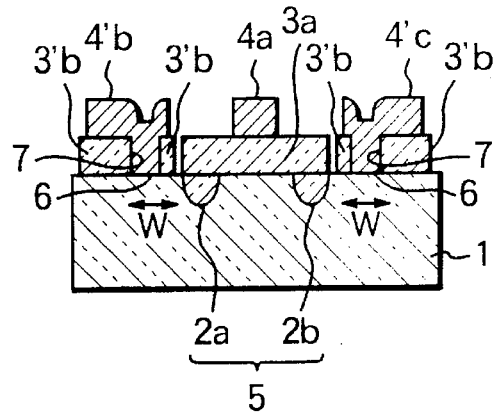
FIG. 6 is a cross-sectional view of a modification of the device shown in FIG. 5.

Referring to FIG. 6, the device shown therein is a modification of the device of FIG. 5 and is similar thereto except that the inside buffer layer section 3a is extended onto the waveguides 2a and 2b but is spatially separated from outside electrodes 4'b and 4'c and outside buffer layer sections 3'b and 3'b. The modified device has the effects similar to the device of FIG. 5 and further has an additional effect that the light transmission loss due to light scattering can be suppressed because the waveguides are covered with the buffer layer section 3a of the transparent material having a refractive index lower than the substrate 1.

Figure 7:
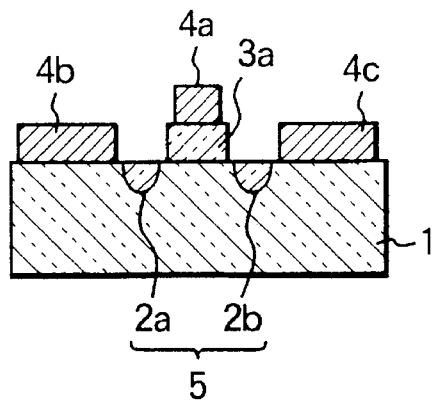
FIG. 7 is a cross-sectional view of an optical control device according to another embodiment of the present invention.

Referring to FIG. 7, a device according to another embodiment is different from the devices of FIGS. 3 and 5 in that the outside buffer layer sections are omitted so that the outside electrodes 4b and 4c are directly formed onto the main surface of the substrate 1.

In the device of FIG. 7, the buffer layer is reduced and limited to the portion 3a under the inside electrode 4a, so that the DC drift is further suppressed. The driving voltage is also reduced because the electrodes 4b and 4c are in direct contact with the main surface of the substrate 1. However, the adjustment of the microwave transmission velocity is difficult by control of the thickness and the dielectric constant of the buffer layer, because the the buffer layer is only formed under the inside electrode 4a but is not formed under the outside electrodes 4b and 4c.

Figure 8:
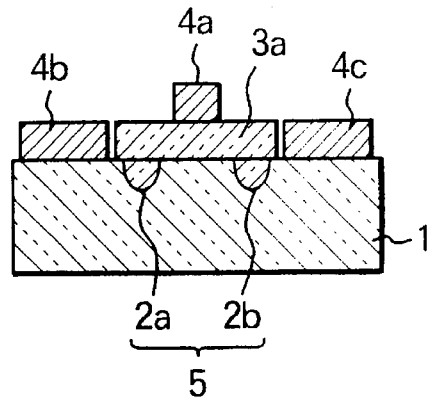
FIG. 8 is a cross-sectional view of a modification of the device shown in FIG. 7.

Referring to FIG. 8, a modification of FIG. 7 also has an extension of the inside buffer layer section 3a onto the waveguides 2a and 2b so that the light transmission loss due to the light scattering is also suppressed.

In any one of the devices according to the present invention, a X-plate or Y-plate of $LiNbO_3$ or $LiTaO_3$ is used for the substrate 1.

Referring to, for example, FIG. 4, in case where either one of the X-plate and the Y-plate is used for the substrate 1 and the waveguides 2a and 2b are formed to extend in the Z-axis direction, the Z-plane is in the sheet surface, that is, in the light input and output end surfaces. Alternatively, when the X-plate is used and waveguides extend in the Y-axis, or when the Y-plate is used and waveguides extend in the X-axis, the Z-plane is in both side surfaces of the substrate 1. Accordingly, although localization of electric charges is caused in the Z-plane by the pyroelectric effect, the z-plane is not present in the main surface of the substrate in which the waveguides are formed according to the present invention. Therefore, the device of the present invention is also improved in the temperature drift.

In the above-mentioned embodiments, two outside electrodes are formed outside the parallel portions of the two waveguides. However, it should be noted that the present invention can be applied to another type where one outside electrode is formed outside the parallel portions of the waveguides.

What is claimed is:

1. An optical control device which comprises:
   a substrate having a main surface and being of a first dielectric and light-transparent material with an eletrooptic effect;
   two waveguides formed in the main surface of said substrate and having parallel portions close to each other;
   a first buffer layer section formed on the main surface between the parallel portions of said waveguides, said first buffer layer being of a second dielectric and light-transparent material having a refractive index smaller than that of said substrate and a dielectric constant of 15 or less;
   a first electrode formed on said first buffer layer; at least one second electrode formed on the main surface of said substrate adjacent to and outside of the parallel portions of said waveguides, said second electrode being spatially separated from said first electrode and said first buffer layer section; and a second buffer layer section of said second dielectric and light-transparent material interposed between said second electrode and the main surface of said substrate, said second buffer layer section being spatially separated from said first buffer layer section, said second electrode partially being in direct contact with the main surface of said substrate.

2. An optical control device as claimed in claim 1, wherein said first buffer layer section has opposite extensions extending onto said parallel portions of said waveguides.

3. An optical control device as claimed in claim 1, wherein said first buffer layer section has opposite extensions extending onto said parallel portions of said waveguides.

4. An optical control device as claimed in claim 1, wherein said second buffer layer section has a side surface near one of said waveguides, said second electrode extending on said side surface to be in direct contact with said main surface of said substrate adjacent said waveguide.

5. An optical control device as claimed in claim 1, wherein said second buffer layer section has a hole through which said second electrode extends to be in direct contact with the main surface of said substrate.

6. An optical control device as claimed in claim 1, which comprises two second electrodes disposed at opposite outsides of said parallel portions of said two waveguides.

7. An optical control device as claimed in claim 1, wherein said substrate is a X-plate.

8. An optical control device as claimed in claim 1, wherein said substrate is a Y-plate.

* * * * *